Patented Nov. 19, 1940

2,222,506

UNITED STATES PATENT OFFICE 2,222,506

PROCESS FOR PRODUCING UREA-FORMALDEHYDE-BUTANOL REACTION PRODUCTS

Theodore S. Hodgins, Royal Oak, and Almon G. Hovey, Pleasant Ridge, Mich., assignors to Reichhold Chemicals, Inc., Formerly Beck, Koller & Company, Inc., Detroit, Mich.

No Drawing. Application April 19, 1939, Serial No. 268,782

4 Claims. (Cl. 260—70)

The invention relates to the preparation of condensation products from urea and aqueous formaldehyde in the presence of butanol, the butanol entering into the reaction in whole or in part.

The product obtained is light colored, insoluble in water but soluble in alcohols, mineral spirits and aromatic hydrocarbons. It is also soluble in castor oil and miscible with alkyd resins but is not soluble in or miscible with ordinary drying oils.

According to the preferred embodiment of the invention the process is carried out under superatmospheric pressure, preferably about 2 atmospheres, employing a substantial molecular excess of formaldehyde, preferably 2½ mols of formaldehyde per mol of urea. The quantity of butanol may be varied somewhat, but good results may be obtained where approximately equimolecular quantities of the butanol and urea are employed. Where a large quantity of butanol is employed a part at least of the butanol serves as a solvent.

In the forming of the improved intermediate urea formaldehyde butanol condensation product the reacting ingredients are preferably heated gradually up to a temperature of approximately 100° C. during a period of about one hour, and maintained at that temperature for approximately one hour under pressure of about two atmospheres. The times, pressures and temperature referred to above have been found to give the most satisfactory results but may be varied somewhat without departing from the spirit of the invention. Following the preparation of the intermediate product, the second or final stage of the reaction may be carried out in an acid medium according to known processes or may be carried out according to the particular methods hereinafter set forth. The time required for the second stage or final resinification may be from 8-12 hours depending on the particular conditions present.

In former methods employed in the manufacture of urea-formaldehyde resin, it has been common practice in the preparation of the intermediate product to react urea and formaldehyde in the presence of a catalyst over long periods of time, such as 24-48 hours at approximately 25-35° C. at atmospheric pressure (760 millimeters). We have found that by using approximately 2 atmosphere pressure (1520 millimeters) in order to prevent the escape of formaldehyde, and by using an excess of formaldehyde, the formaldehyde being in ratio of 2½-3 mols with respect to 1 mol of urea, that the time necessary for forming this intermediate condensation product can be reduced to approximately one hour at 100° C. This results not only in greatly reduced processing time, and thereby speeding up production and enabling more products to be made in the same amount of equipment, but what is even more important, it insures much greater uniformity due to complete assurance that the formaldehyde will not escape and that an equal amount of formaldehyde will be tied up from batch to batch.

We have also found that approximately 25% excess formaldehyde (on molar proportions) over the theoretical is the minimum amount that can be used to make clear, stable resin solutions, i. e., at least 2½ mols of formaldehyde to 1 mol of urea. If substantially less than this minimum ratio is employed, the results are first, turbid, grayish solutions, and then white insoluble gels.

The successful, time-saving combination of urea, aqueous formaldehyde, and butanol, in the proportions given in the example, under superatmospheric pressure has not heretofore been employed on account of the fact that such process appeared impossible on account of gel formation and instability. According to our invention, in which we use an excess of formaldehyde which promotes stability and uniformity, we obtain reproducible results in 1-2 hours at 100° C. at approximately 2 atmospheres pressure (1520 millimeters) instead of 24-48 hours at 25-35° C. at atmospheric pressure (760 millimeters).

The value of this great saving in time in large industrial operations where apparatus is large and expensive can readily be appreciated, for the length of time during which the apparatus is employed figures heavily in cost calculations and may eventually be the marginal factor in favor of this process as compared to less efficient processes.

The invention will be more readily understood by reference to the accompanying example:

*Example 1.*—1944 grams of aqueous formaldehyde (24 mols on a dry basis) and 532 grams (7.2 mols) of butanol and 40 grams of 26% ammonia are thoroughly agitated in a pressure autoclave and 480 grams (8 mols) of urea are slowly added. Care is taken that the addition of urea is made slow enough so that the solution remains clear throughout the entire addition. When all the urea is added, the clear solution is heated to 100° C. in one hour and held at 100° C. for about one hour under approximately 2 atmospheric pressure. We do not separate out the intermediate product, but rather add an excess of butanol and complete the reaction.

The preparation of the final product may be carried out in various ways of which the following are given as illustrative.

(a) The final reaction is carried out in an acid medium under vacuum distillation of about 100 millimeters at approximately 65–75° C. for period of approximately 12 hours. The product obtained had the following characteristics:

Yield—122 grams of solid resin which constitute 2.5 grams of resin per gram of urea used in the starting formula. In other words, this indicates that ½ mol of butanol is retained for each mol of urea. The 60% solution of resin in 40% butanol had the following constants:

Color_____Colorless (water-white)
Acid number_____4.0.
Viscosity (Gardner-Holdt)
 at 25° C_____R–S.
Specific gravity at 20° C__1.03.
Solvent tolerances as follows:

Butanol_____Infinite
Toluol_____Infinite
Xylol_____Infinite
Mineral spirits_____per cent__ 200+
Castor oil_____Infinite This product is completely miscible with practically every type of commercial alkyd resin on the market, and produces hard, transparent, glass-like finishes when combined with alkyd resins of the light-colored type. It is very useful in making white, hard, humidity and grease resistant, marproof refrigerator finishes, and is especially adaptable to the new type of polychromatic finishes.

(b) The final reaction may be also carried out in an acid medium at atmospheric pressure at a temperature of approximately 92° C., i. e., the temperature of a constant boiling mixture of butanol and water, and the temperature may be gradually increased as the water is eliminated until 130° C. is reached. The time required was 8–10 hours. A product results having the following characteristics:

Yield—1210 grams of non-volatile resin. A solution of this resin consisting of 60% non-volatile, 20% toluol, and 20% butanol has the following characteristics:

Specific gravity at 20° C_1.02.
Viscosity at 25° C_____Q–R.
Color_____Colorless (water-white)
Acid number_____5.0.

This resin solution had the same good compatibility properties in general as the one in part (a).

The time required for the final acid stage resinification process will of course vary with the size of the equipment and the speed of distillation.

We claim:

1. An improvement in the process of producing a low molecular intermediate condensation product of the urea formaldehyde type, which comprises reacting urea with a molecular excess of aqueous formaldehyde in the proportion of one mol of urea to 2½–3 mols of formaldehyde in the presence of butanol at a temperature of about 100° C. under a pressure of about 2 atmospheres for a period of approximately one hour said urea, formaldehyde and butanol constituting the principal reacting ingredients.

2. A process of producing a urea formaldehyde butanol resin which comprises first forming a low molecular intermediate by reacting urea with a molecular excess of aqueous formaldehyde in the proportion of one mol of urea to 2½–3 mols of formaldehyde, in the presence of butanol at a temperature of about 100° C. under a pressure of approximately 2 atmospheres for a period of about 1 hour, and then subjecting the said intermediate product to a final acid resinification for a period of 8–12 hours in the presence of an excess of butanol, said urea, formaldehyde and butanol constituting the principal reacting ingredients.

3. An improvement in the process of producing a low molecular intermediate condensation product of the urea formaldehyde type, which comprises agitating aqueous formaldehyde butanol and an alkaline catalyst in a pressure autoclave, adding urea slowly enough so that the solution remains clear throughout the entire addition and when all the urea has been added heating the clear solution to about 100° C., and maintaining this temperature for about one hour at approximately two atmospheres pressure, the formaldehyde being employed in molecular excess over the urea in the proportions of one mol of the urea to two and one-half to three mols of formaldehyde, the urea, formaldehyde and butanol constituting the principal reacting ingredients.

4. A process of producing a urea formaldehyde butanol resin which comprises first forming a low molecular intermediate by agitating aqueous formaldehyde butanol and an alkaline catalyst in a pressure autoclave, adding urea slowly enough so that the solution remains clear throughout the entire addition and when all the urea has been added heating the clear solution to about 100° C., and maintaining this temperature for about one hour at approximately two atmospheres pressure, the formaldehyde being employed in molecular excess over the urea in the proportions of one mol of the urea to two and one-half to three mols of formaldehyde, the urea, formaldehyde and butanol constituting the principal reacting ingredients, then adding an excess of butanol to the intermediate condensation product, and subjecting the same to a final acid resinification for a period of 8 to 12 hours, whereby a product is obtained which is soluble in alcohols, mineral spirits, aromatic hydrocarbons and castor oil and miscible with alkyd resins, but is substantially insoluble in water and not readily miscible in ordinary drying oils.

THEODORE S. HODGINS.
ALMON G. HOVEY.